(12) United States Patent
Asano (10) Patent No.: US 9,742,950 B2
(45) Date of Patent: Aug. 22, 2017

(54) NOISE SUPPRESSING DEVICE, IMAGE READING DEVICE, AND IMAGE FORMING APPARATUS

(71) Applicant: FUJI XEROX CO., LTD., Tokyo (JP)

(72) Inventor: Motohiro Asano, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/041,724

(22) Filed: Feb. 11, 2016

(65) Prior Publication Data

US 2017/0094092 A1 Mar. 30, 2017

(30) Foreign Application Priority Data

Sep. 24, 2015 (JP) ................................. 2015-187208

(51) Int. Cl.
*H04N 1/04* (2006.01)
*H04N 1/00* (2006.01)
*H04N 1/56* (2006.01)

(52) U.S. Cl.
CPC ....... *H04N 1/00994* (2013.01); *H04N 1/0083* (2013.01); *H04N 1/00933* (2013.01); *H04N 1/56* (2013.01); *H04N 2201/0091* (2013.01)

(58) Field of Classification Search
CPC ... B41J 2/45; H04N 1/00519; H04N 1/00551; H04N 1/00557; H04N 1/0083; H04N 1/2307; H04N 2201/0094; G06K 15/00; G06K 15/1209; G06K 15/1247; G11B 17/056; G11B 33/122; H01L 27/3269; H05K 1/147

USPC ...... 358/498, 474, 497, 1.13, 496, 1.12, 401
See application file for complete search history.

(56) References Cited

U.S. PATENT DOCUMENTS

| | | | | |
|---|---|---|---|---|
| 5,481,656 | A * | 1/1996 | Wakabayashi | G06K 15/00 358/1.13 |
| 5,659,459 | A * | 8/1997 | Wakabayashi | B41J 29/377 174/51 |
| 5,810,714 | A * | 9/1998 | Takamura | A61B 1/05 600/130 |
| 2006/0098869 | A1* | 5/2006 | Chen | H04N 9/045 382/167 |
| 2007/0077001 | A1* | 4/2007 | Hayashi | B41J 2/45 385/14 |
| 2007/0235741 | A1* | 10/2007 | Nakamura | B41J 2/45 257/79 |
| 2007/0242017 | A1* | 10/2007 | Mitsuse | B41J 2/45 345/92 |

(Continued)

FOREIGN PATENT DOCUMENTS

| | | |
|---|---|---|
| JP | 6-236822 A | 8/1994 |
| JP | 2012-70279 A | 4/2012 |
| WO | 2012/039119 A1 | 3/2012 |

*Primary Examiner* — Negussie Worku
(74) *Attorney, Agent, or Firm* — Sughrue Mion, PLLC (57) ABSTRACT

A noise suppressing device includes a first circuit board not being grounded; a second circuit board connected to the first circuit board through a transmission line including a signal line that transmits a high-frequency signal and a ground line, the second circuit board including a ground layer being grounded; and a high-frequency reducing element that is arranged between the ground layer of the second circuit board and the ground line of the transmission line and that reduces a high-frequency signal excited at the ground line of the transmission line.

7 Claims, 11 Drawing Sheets

(56) References Cited

U.S. PATENT DOCUMENTS

| | | | |
|---|---|---|---|
| 2009/0141997 A1* | 6/2009 | Lee | A61B 1/0008 382/260 |
| 2011/0235139 A1* | 9/2011 | Kurokawa | G03G 15/60 358/498 |
| 2011/0235140 A1* | 9/2011 | Ito | G03G 15/605 358/498 |
| 2014/0055529 A1* | 2/2014 | Matsunaga | B41J 19/005 347/50 |
| 2015/0002910 A1* | 1/2015 | Miyazaki | H04N 1/024 358/451 |
| 2016/0187802 A1* | 6/2016 | Kagawa | G03G 15/0189 399/89 |
| 2017/0085048 A1* | 3/2017 | Bruhn | H01R 39/383 |

\* cited by examiner

NOISE SUPPRESSING DEVICE, IMAGE READING DEVICE, AND IMAGE FORMING APPARATUS

CROSS-REFERENCE TO RELATED APPLICATIONS

This application is based on and claims priority under 35 USC 119 from Japanese Patent Application No. 2015-187208 filed Sep. 24, 2015.

BACKGROUND

The present invention relates to a noise suppressing device, an image reading device, and an image forming apparatus.

SUMMARY

According to an aspect of the invention, there is provided a noise suppressing device including a first circuit board not being grounded; a second circuit board connected to the first circuit board through a transmission line including a signal line that transmits a high-frequency signal and a ground line, the second circuit board including a ground layer being grounded; and a high-frequency reducing element that is arranged between the ground layer of the second circuit board and the ground line of the transmission line and that reduces a high-frequency signal excited at the ground line of the transmission line.

BRIEF DESCRIPTION OF THE DRAWINGS

An exemplary embodiment of the present invention will be described in detail based on the following figures, wherein.

DETAILED DESCRIPTION

An exemplary embodiment of the invention is described below with reference to the drawings.

First Exemplary Embodiment

Figure 1:
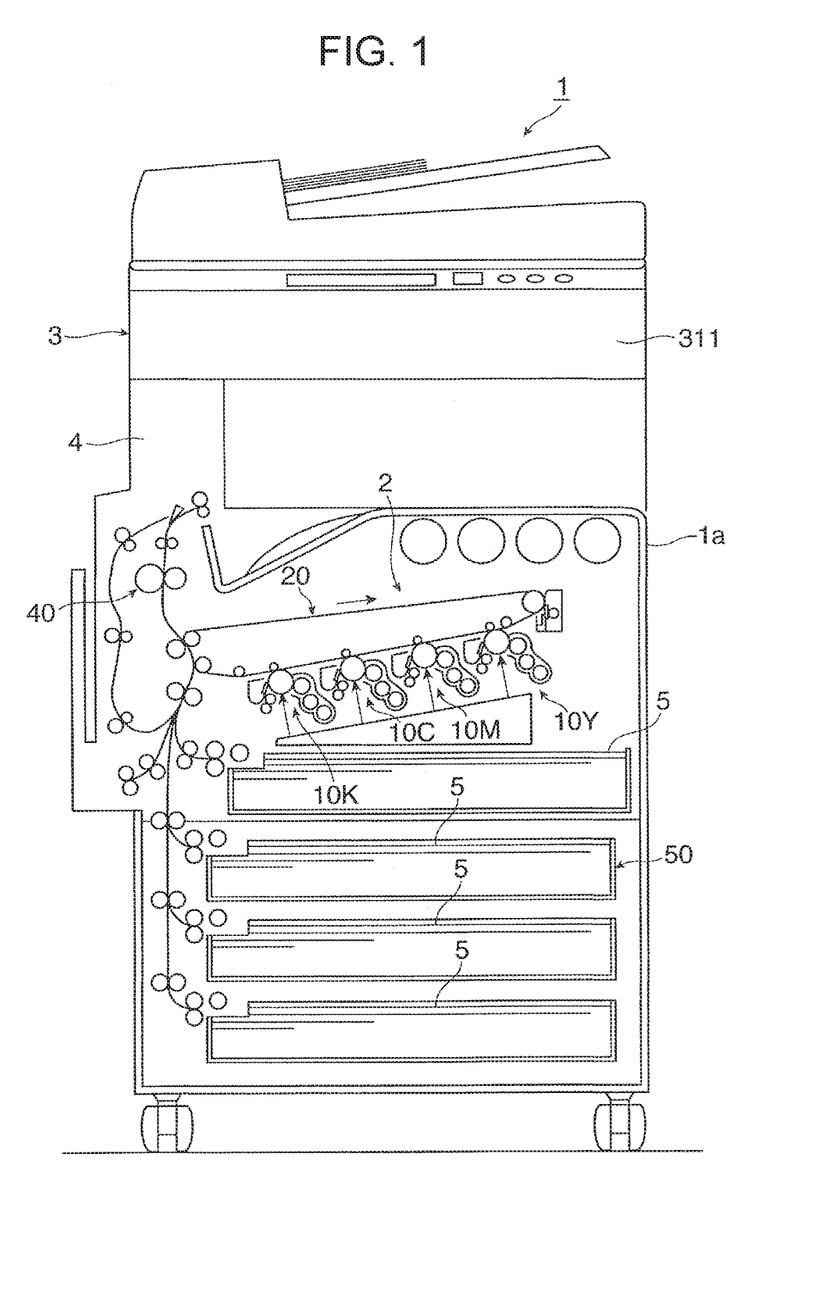
FIG. 1 is a general configuration diagram showing an image forming apparatus to which a noise reducing device and an image reading device according to a first exemplary embodiment of the invention are applied.

FIG. 1 is a configuration diagram showing an overview of an image forming apparatus to which a noise reducing device and an image reading device according to a first exemplary embodiment of the invention are applied.

General Configuration of Image Forming Apparatus

As shown in FIG. 1, an image forming apparatus 1 according to the first exemplary embodiment is formed as, for example, a color copier. The image forming apparatus 1 includes an image reading device 3 that reads an image of a document, and an image forming unit 2 serving as an example of an image forming section that forms an image on a recording medium in accordance with image data read by the image reading device 3 or image data input from an external device. The image reading device 3 is arranged above an apparatus body 1a in a manner supported by a support 4. The apparatus body 1a houses the image forming unit 2. A space for outputting the recording medium with the image formed thereon is formed between the image reading device 3 and the apparatus body 1a.

The image forming unit 2 includes four image forming devices 10Y, 10M, 10C, and 10K that respectively dedicatedly form toner images of four colors of yellow (Y), magenta (M), cyan (C), and black (K); an intermediate transfer device 20 that carries the toner images respectively formed by the image forming devices 10Y, 10M, 10C, and 10K and transports the toner images to a second transfer position at which the intermediate transfer device 20 finally second transfers the toner images on a recording paper 5 being an example of a recording medium; a paper feed device 50 that houses a predetermined recording paper 5 to be fed to the second transfer position of the intermediate transfer device 20 and transports the recording paper 5; and a fixing device 40 that fixes the toner images on the recording paper 5 second transferred by the intermediate transfer device 20.

Configuration of Image Reading Device

Figure 2:
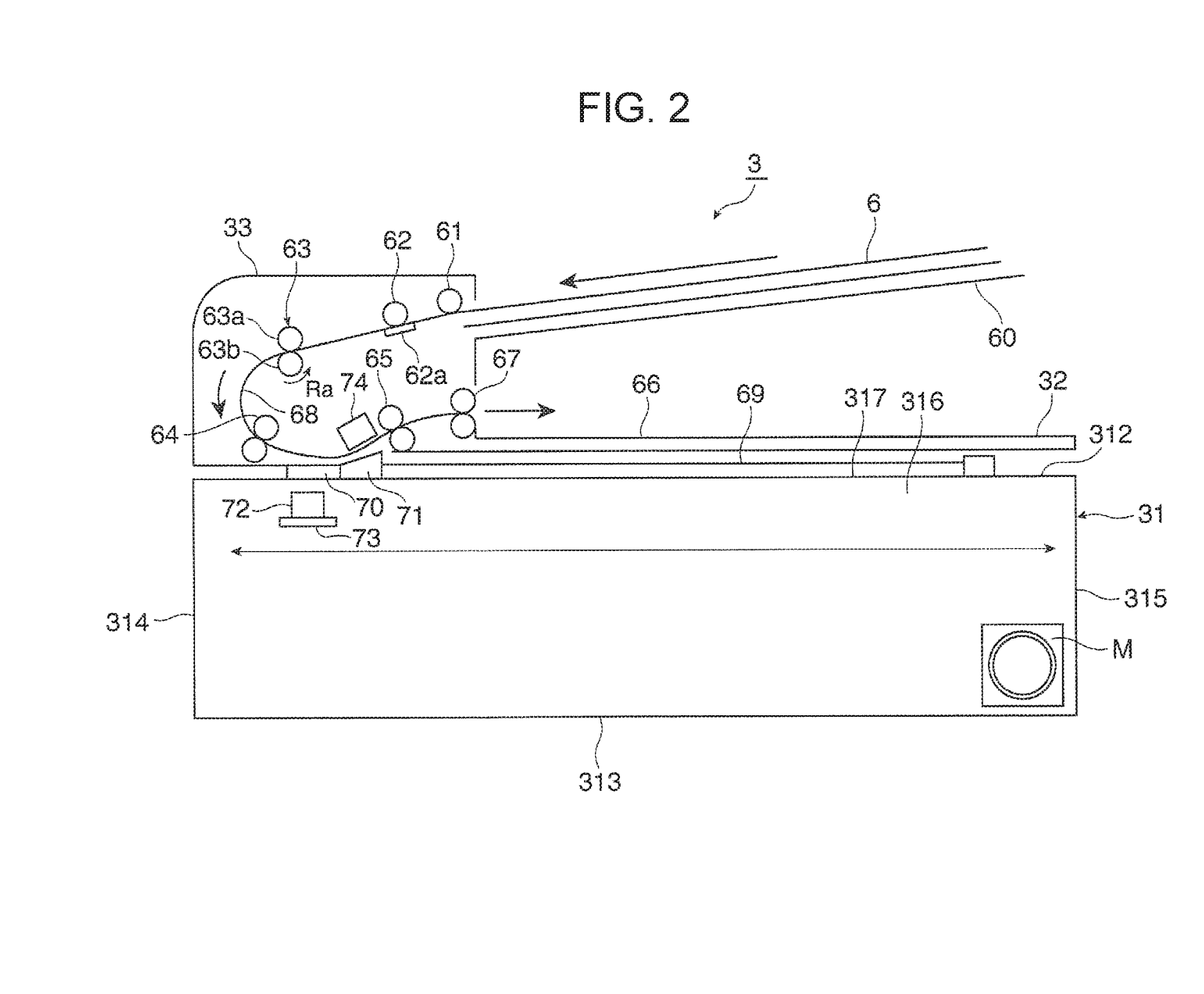
FIG. 2 is a configuration diagram showing the image reading device according to the first exemplary embodiment of the invention.

FIG. 2 is a schematic configuration diagram showing the configuration of the image reading device according to the first exemplary embodiment of the invention.

The image reading device 3 roughly includes a housing 31 having a document reading surface at an upper end surface of the housing, a document press covering 32 attached to the housing 31 in an openable and closable manner, and an automatic document transport device (duplex automatic document feeder, hereinafter, referred to as DADF) 33 provided at one end portion (in the drawing example, a left end portion) of the document press covering 32.

The image reading device 3 may be switched between a first reading mode, in which images on the front and back surfaces of documents 6 are read while the documents 6 are automatically transported one by one by the DADF 33, and a second reading mode, in which an image on the front surface of a document 6 placed on a document table 69 (described later) is read.

The DADF 33 has a document transport mechanism (a transport unit) including a document housing part 60 that is able to house plural documents 6 in a stacked manner with surfaces to be read (first surfaces) facing upward; a nudger roller 61 that sends the documents 6 from the document housing part 60; a feed roller 62 that separates and feeds the documents 6 sent by the nudger roller 61 one by one; a retard pad 62a that is pressed by the feed roller 62 and separates the documents 6 one by one; a first transport roller 63 that transports the document 6 toward a first reading position; a second transport roller 64 that transports the document 6 transported by the first transport roller 63 to the first reading position; a third transport roller 65 that is arranged downstream of the second transport roller 64 and transports the document 6 which has passed through the first reading position; and an output roller 67 that outputs the document 6 transported by the third transport roller 65 to an output housing part 66. The nudger roller 61, the feed roller 62, the first to third transport rollers 63 to 65, and the output roller 67 are driven by a driving part (not shown) while the document 6 is read. The first transport roller 63 is a registration roller that adjusts a transport timing to the reading position of the document 6.

In the first transport roller 63, while a transport roller 63b serving as a driving roller arranged at the lower side and being rotatable in a direction indicated by arrow Ra stops, the leading edge of the document 6 transported by the feed roller 62 positioned at the upstream side in a transport direction of the document 6 contacts a contact part between the transport roller 63b and a transport roller 63a serving as a driven roller. Then, the first transport roller 63 executes skew correction by curving a leading edge region of the document 6, aligning the leading edge of the document 6 with the axial direction of the first transport roller 63, and then starting transport of the document 6.

Also, the DADF 33 includes a transport path 68 that is formed in a substantially U shape arranged in landscape orientation, and that guides the document 6 to the first reading position and guides the document 6 from the first reading position in an output direction.

The housing 31 of the image reading device 3 is formed in a rectangular-parallelepiped-shaped box having an opening at a portion of an upper end surface of the box. The housing 31 includes an upper wall 312 facing the document press covering 32, a bottom wall 313 facing the upper wall 312, a side wall 314 and a side wall 315 facing each other along a sub-scanning direction (a left-right direction in FIG. 2) with the bottom wall 313 interposed therebetween, a front wall 311 (see FIG. 1) positioned at a front surface of the housing 31, and a rear wall 316 facing the front wall 311 in a main-scanning direction (a direction orthogonal to the paper face of FIG. 2).

The upper wall 312 of the housing 31 has a large opening 317 having a planar rectangular shape at a portion corresponding to a second reading position for the document 6 to be read in the second reading mode. The transparent document table 69 (platen glass) that supports the document 6 is arranged at the opening 317. Also, a transparent reading window 70 for reading an image on the front surface (a first surface) of the document 6 in the first reading mode is provided at the DADF 33 side of the document table 69. A guide member 71 is provided between the reading window 70 and the document plate 69. The guide member 71 has an inclined upper surface that guides the document 6, which has passed through the reading position in the first reading mode, to the third transport roller 65.

The image reading device 3 includes a first image reading unit 72 serving as an example of a first image reading section that reads an image on the front surface of a document 6, in the housing 31. The first image reading unit 72 is arranged along the main-scanning direction (the direction orthogonal to the drawing). Also, the first image reading unit 72 is attached to a movable body 73 formed of a carriage that is movable along the sub-scanning direction by a driving motor M through a driving pulley, a driving wire, etc. (not shown). The movable body 73 is guided by a rail (not shown) and is movable in a region indicated by arrows in FIG. 2 along the sub-scanning direction. The movable body 73 is stopped at the illustrated position in the first reading mode. Also, in the second reading mode, the image of the document 6 is read, while the movable body 73 moves along the sub-scanning direction and a reading target region of the document 6 placed on the document table 69 is illuminated.

The image reading device 3 also includes a second image reading unit 74 serving as an example of a second image reading section that reads an image on the back surface of the document 6, in the DADF 33. The second image reading unit 74 is arranged upstream of the third transport roller 65 in the transport path 68. The second image reading unit 74 may be arranged at a position facing the first image reading unit 72 stopped at the first reading position, or another position as long as the image on the back surface of the document 6 is readable at that position.

Figure 3:
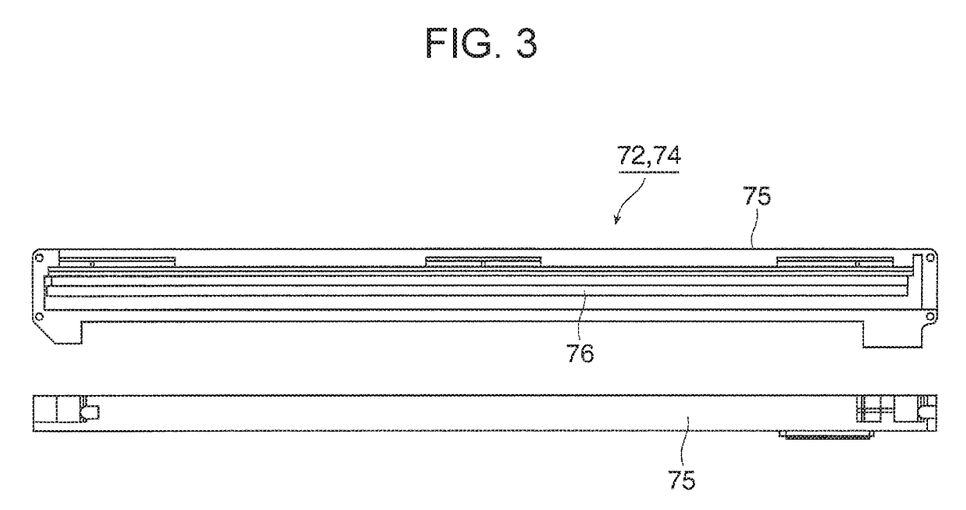
FIG. 3 is a configuration diagram showing an image reading unit.

For each of the first and second image reading units 72 and 74, for example, a contact image sensor (CIS) is used. As shown in FIG. 3, the first and second image reading units 72 and 74 each have a narrow and long rectangular-parallelepiped shape having a rectangular cross section with a length corresponding to the short side direction or the long side direction of the document 6 with A4 size (210×297 mm). The first and second image reading units 72 and 74 each have a housing 75 and an opening 76 at an upper end surface of the housing 75. The opening 76 allows the image of the document 6 to be read while the document 6 is illuminated with light. The first and second image reading units 72 and 74 have configurations similar to each other.

Figure 4:
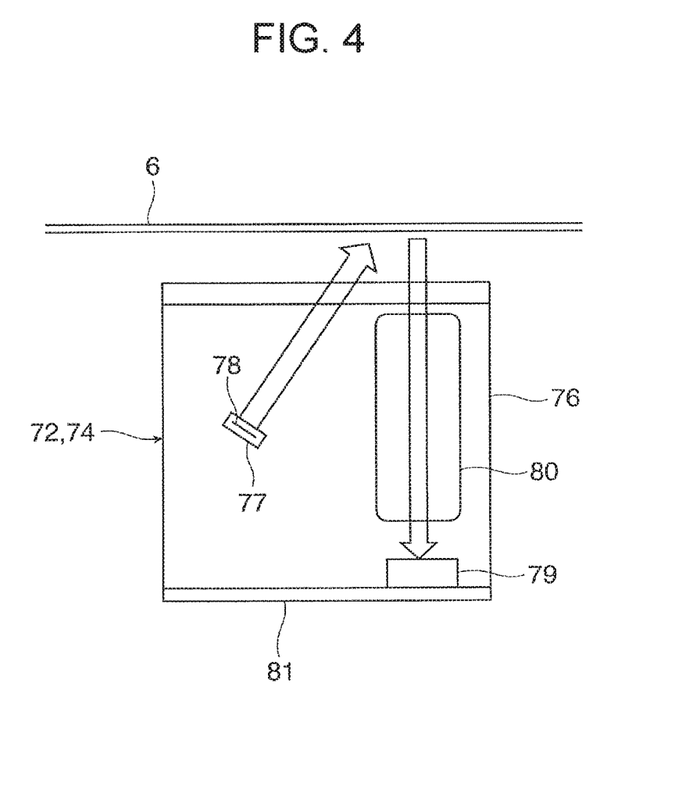
FIG. 4 is a cross-sectional configuration diagram showing the image reading unit.

More specifically, as shown in FIG. 4, the first and second image reading units 72 and 74 each include a light source 77 serving as an example of an illuminator formed of a light emitting diode (LED) that illuminates the document 6, a diffuser 78 that diffuses the light emitted from the light source 77 toward the document 6 to uniformly illuminate the document 6, a SELFOC (registered trademark) lens 80 serving as an imaging lens that causes the image of the document 6 to be focused on an image reading element 79, and the image reading element 79 formed of a charge-coupled device (CCD) or the like that reads the image of the document 6. The image reading element 79 is mounted on an image reading substrate 81 serving as an example of a first circuit board. The image reading element 79 is not limited to the CCD, and a complementary metal oxide semiconductor (CMOS) or the like may be used.

In the first reading mode, as shown in FIG. 2, the DADF 33 automatically transports the document 6 while the movable body 73 is stopped at the first reading position set at the left end portion of the housing 31. As shown in FIG. 4, in the first image reading unit 72, while the document 6 passing through the position above the reading window 70 is illuminated with light by the light source 77, a reflection light image from the document 6 is focused on the image reading element 79 through the SELFOC (registered trademark) lens 80, and the image on the front surface of the document 6 is read by the image reading element 79. The image reading element 79 outputs image data (a signal) of the front surface of the read document 6. As shown in FIG. 2, in the second image reading unit 74, while the back surface of the document 6 passing through the position above the guide member 71 along the transport path 68 is illuminated with light by the light source 77, a reflection light image from the document 6 is focused on the image reading element 79 through the SELFOC (registered trademark) lens 80, and the image on the back surface of the document 6 is read by the image reading element 79. The image reading element 79 outputs image data (a signal) of the back surface of the read document 6.

In contrast, in the second reading mode, as shown in FIG. 2, while the movable body 73 is driven by the driving motor M and the movable body 73 moves along the sub-scanning direction, the document 6 is illuminated with light by the light source 77 of the first image reading unit 72. In the first image reading unit 72, as shown in FIG. 4, a reflection light image from the document 6 is focused on the image reading element 79 through the SELFOC (registered trademark) lens 80, the image on the front surface of the document 6 is read by the image reading element 79, and image data is output from the image reading element 79.

Configuration of Major Section of Image Reading Device

Figure 5:
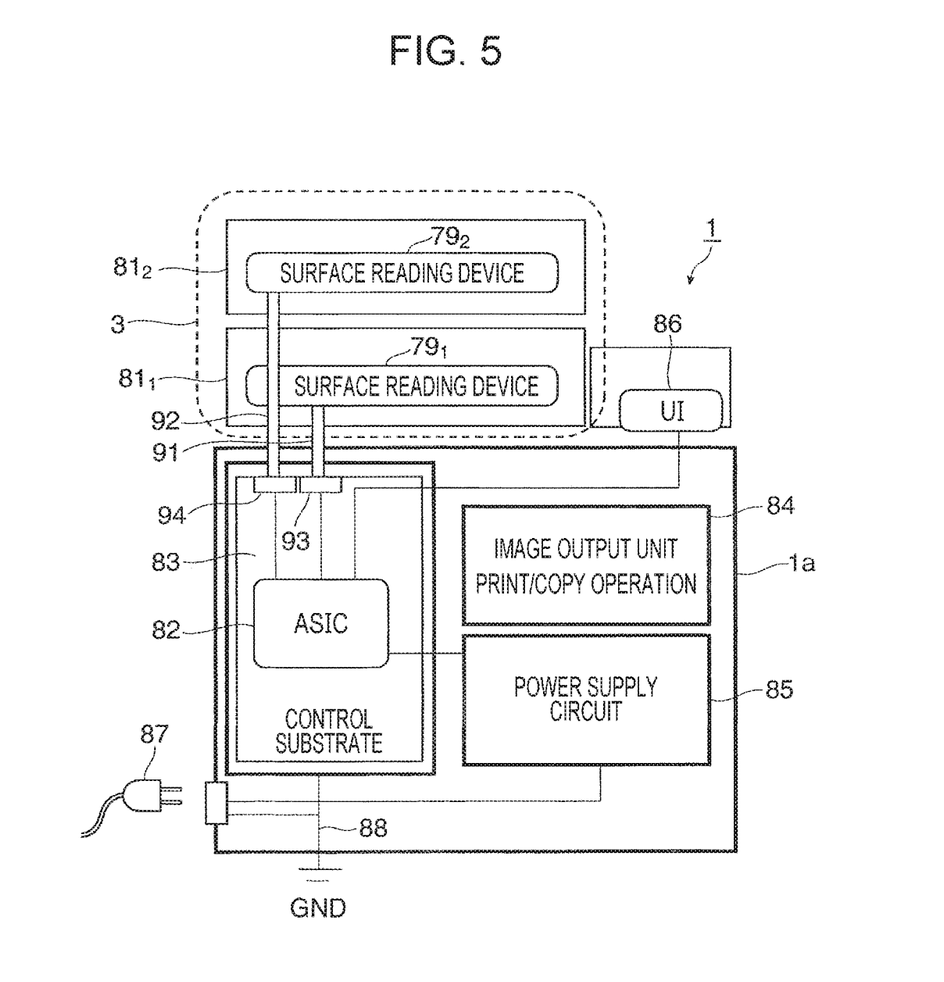
FIG. 5 is a block diagram showing the image reading device to which the noise reducing device according to the first exemplary embodiment of the invention is applied.

As shown in FIG. 5, the image forming apparatus 1 including the image reading device 3 according to the first exemplary embodiment includes a first image reading substrate $81_1$ serving as an example of a first circuit board having an image reading element $79_1$ of the first image reading unit 72 mounted thereon, a second image reading substrate $81_2$ serving as an example of a first circuit board having an image reading element $79_2$ of the second image reading unit 74 mounted thereon, a control substrate 83 serving as an example of a second circuit board having a control circuit (application specific integrated circuit, ASIC) 82 mounted thereon, an image output unit 84 that outputs an image on the basis of an image of a document 6 read by the image reading device 3 and image data input from an external device, a power supply circuit 85 that supplies power of a predetermined direct-current (DC) voltage or the like to the control substrate 83 and the image output unit 84, and a user interface 86 to which a user inputs an image forming operation. An alternating-current voltage of 100 V or the like is supplied to the power supply circuit 85 from a commercial power supply 87. Also, the control substrate 83 is connected to the ground through a ground terminal 88.

The image reading element $79_1$ mounted on the first image reading substrate $81_1$ is connected to the control substrate 83 through a first flexible flat cable (FFC) 91 serving as an example of a transmission line including a signal line that transmits a high-frequency signal, and a ground line. The image reading element $79_2$ mounted on the second image reading substrate $81_2$ is connected to the control substrate 83 through a second flexible flat cable (FFC) 92 serving as an example of a transmission line including a signal line that transmits a high-frequency signal, and a ground line. The control substrate 83 has first and second connectors 93 and 94 to which the first and second flexible flat cables 91 and 92 are connected.

Figure 6:
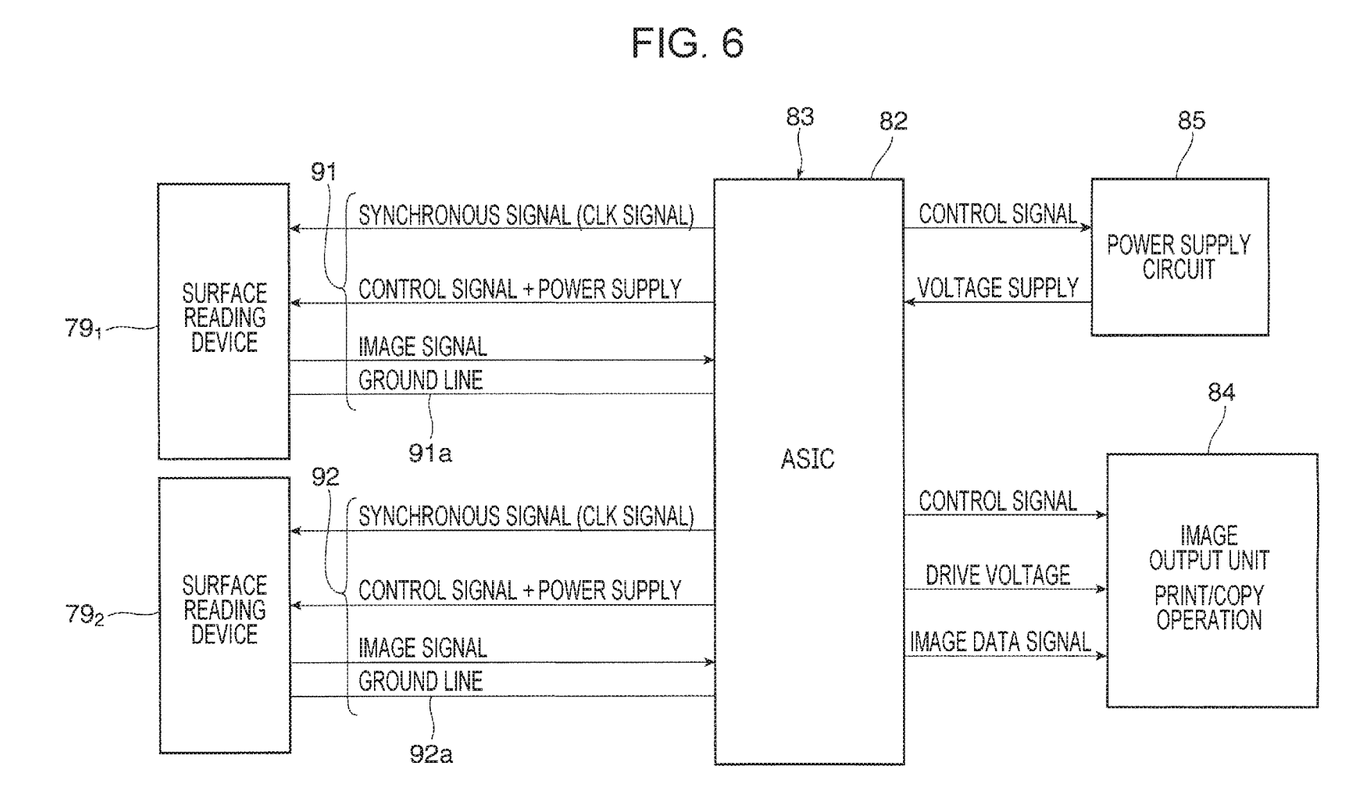
FIG. 6 is a block diagram showing a major section of the image reading device to which the noise reducing device according to the first exemplary embodiment of the invention is applied.

FIG. 6 is a block diagram showing connection states of respective circuits in the image forming apparatus and the image reading device.

The image reading element $79_1$ mounted on the first image reading substrate $81_1$ is connected to the control circuit (ASIC) 82 of the control substrate 83 through the first flexible flat cable 91. For example, a synchronous signal formed of a high-frequency clock signal with a frequency in a range from 100 MHz to 1 GHz, a control signal, and power are output from the control circuit (ASIC) 82 to the image reading element $79_1$. In contrast, an image signal is output from the image reading element $79_1$ to the control circuit (ASIC) 82. Also, the first flexible flat cable 91 includes a ground line 91a formed of a shield or the like. The image reading element $79_2$ mounted on the second image reading substrate $81_2$ is connected to the control circuit (ASIC) 82 of the control substrate 83 through the second flexible flat cable 92. For example, a synchronous signal formed of a high-frequency clock signal with a frequency in a range from 100 MHz to 1 GHz, a control signal, and power are output from the control circuit (ASIC) 82 to the image reading element $79_2$. In contrast, an image signal is output from the image reading element $79_2$ to the control circuit (ASIC) 82. Also, the second flexible flat cable 92 includes a ground line 92a formed of a shield or the like.

Also, a control signal, a drive voltage, and an image data signal are output from the control circuit (ASIC) 82 to the image output unit 84. Further, a control signal is output from the control circuit (ASIC) 82 to the power supply circuit 85, and a predetermined voltage is output from the power supply circuit 85 to the control circuit (ASIC) 82.

Figure 7:
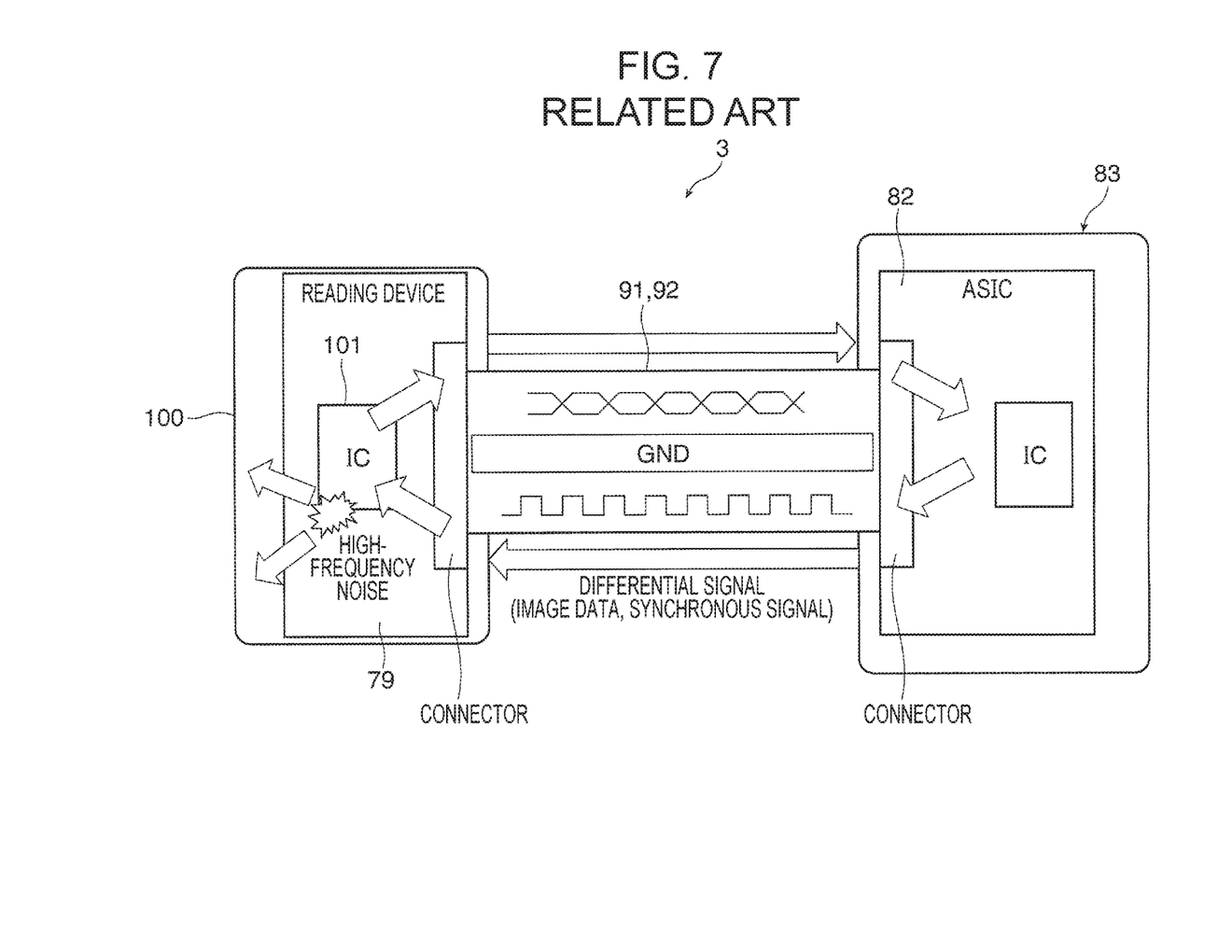
FIG. 7 is a schematic diagram showing a major section of an image reading device of related art.

In the image reading device 3 of related art, as shown in FIG. 7, the image reading element 79 is covered with a grounded metal shield member 100 arranged in the housing 31 of the image reading device 3. A high-frequency noise (electro magnetic interference, EMI) generated from an IC 101 or the like that drives the image reading element 79 flows to the ground through the metal shield member 100. Hence, the high-frequency noise does not result in a serious problem.

Figure 8:
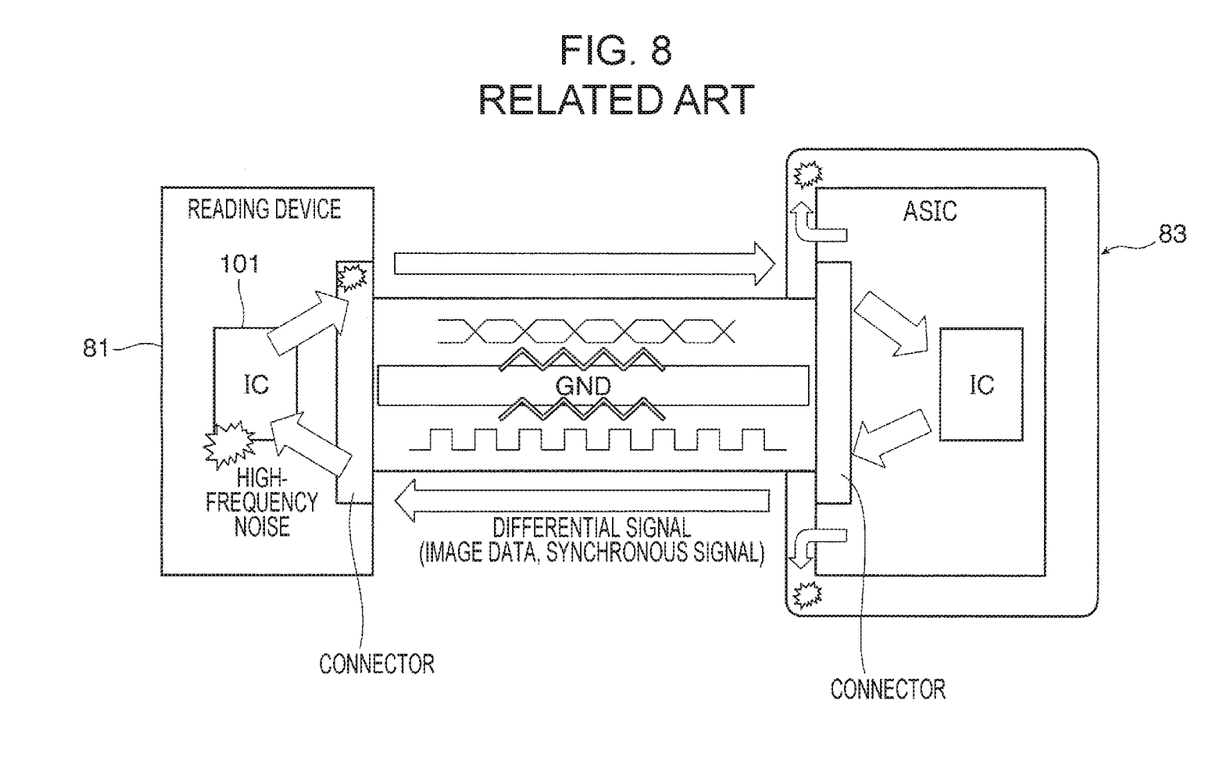
FIG. 8 is a schematic diagram showing the major section of the image reading device of related art.
Figure 9A:
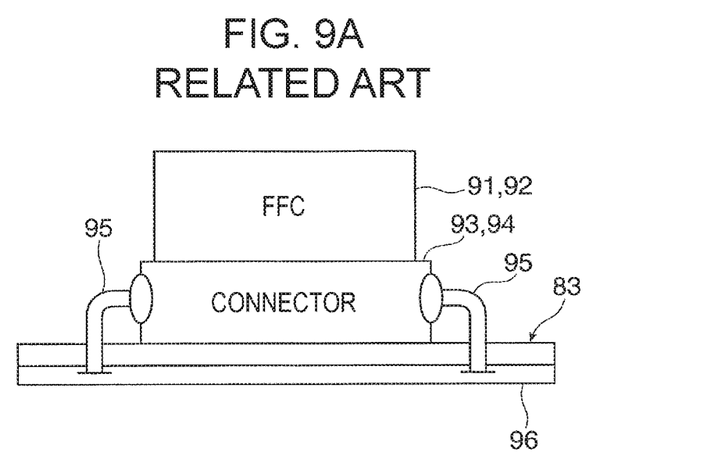
FIGS. 9A and 9B provide configuration diagrams showing the major section of the image reading device of related art.
Figure 9B:
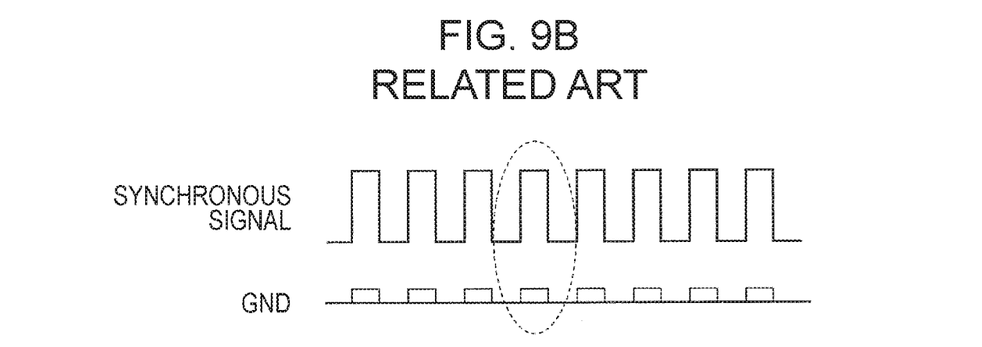

In contrast, as shown in FIG. 8, the image reading substrate 81 having mounted thereon the image reading element 79 is mounted on each of the first and second image reading units 72 and 74, and the first and second image reading units 72 and 74 each are not provided with the metal shield member. A high-frequency noise (EMI) generated from an IC or the like that drives the image reading element 79 does not flow to the ground through the metal shield member without any countermeasure for grounding. Hence, the high-frequency noise (EMI) is superposed on each of the ground lines 91a and 92a of the first and second flexible flat cables 91 and 92. Consequently, the high-frequency noise (EMI) is diffused in a ground layer 96 of the control substrate 83 through ground terminals 95 of the connectors 93 and 94 as shown in FIG. 9A, and results in a current noise having a period corresponding to the period of the synchronous signal as shown in FIG. 9B.

Figure 10A:
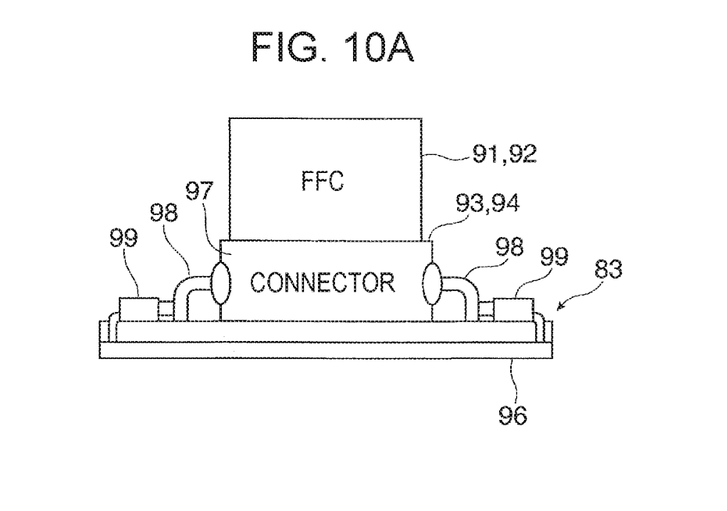
FIGS. 10A and 10B provide configuration diagrams showing the major section of the image reading device to which the noise reducing device according to the first exemplary embodiment of the invention is applied.

Hence, in this exemplary embodiment, as shown in FIG. 10A, a casing 97 of each of the connectors 93 and 94 connected to the ground lines 91a and 92a of the first and second flexible flat cables 91 and 92 is not directly connected to the ground layer 96 of the control substrate 83 through ground terminals 98, but the casing 97 is connected to the ground layer 96 of the control substrate 83 through high-frequency reducing coils 99 each serving as an example of a high-frequency reducing element that reduces a high-frequency signal excited at each of the ground lines 91a and 92a of the first and second flexible flat cables 91 and 92. The ground layer 96 of the control substrate 83 is grounded through the ground terminal 88 shown in FIG. 5.

In this case, an impedance Z of the high-frequency reducing coil 99 is given by $|Z|=2\pi fL$, where f (Hz) is a frequency of the noise and L (H) is an inductance of the high-frequency reducing coil 99. If the frequency of the high-frequency noise is in a range from about 100 MHz to about 1 GHz, the inductance L of the high-frequency reducing coil 99 is set, for example, in a range from about 0.1 to about 1 μH.

Operation of Major Section of Image Reading Device

In the image reading device 3 according to the first exemplary embodiment, the ground noise caused by the high-frequency signal from the image reading substrates $81_1$ and $81_2$ connected to the control substrate 83 through the first and second flexible flat cables 91 and 92 is reduced as follows.

As shown in FIG. 6, in the image reading device 3, when an image of a document 6 is read by each of the image reading elements $79_1$ and $79_2$ mounted on the image reading substrates $81_1$ and $81_2$, the synchronous signal (the clock signal) with the frequency in the range from about 100 MHz to about 1 GHz and the control signal are output together with the power to each of the image reading elements $79_1$ and $79_2$ mounted on the image reading substrates $81_1$ and $81_2$ from the control circuit (ASIC) 82 of the control substrate 83 through corresponding one of the first and second flexible flat cables 91 and 92, and the image signal is transmitted from each of the image reading elements $79_1$ and $79_2$ mounted on the image reading substrates $81_1$ and $81_2$.

Figure 10B:
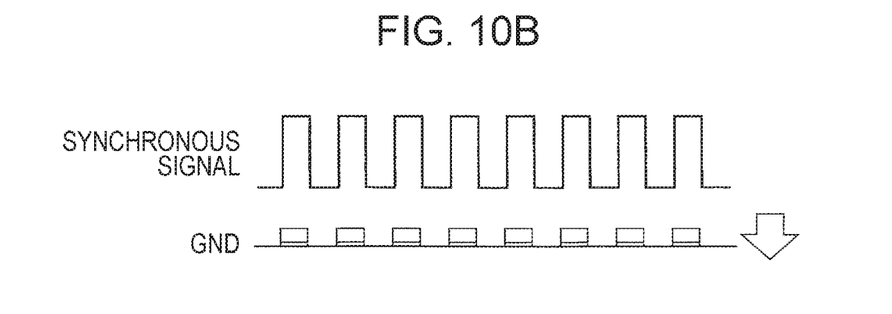

At this time, as shown in FIG. 10B, a high-frequency noise (EMI) with a frequency in a range from about 100 MHz to about 1 GHz which is equivalent to the frequency of the synchronous signal (the clock signal) is excited by the synchronous signal (the clock signal) at each of the ground lines $91a$ and $92b$ of the first and second flexible flat cables 91 and 92.

Meanwhile, in this exemplary embodiment, as shown in FIG. 10A, the casing 97 of each of the connectors 93 and 94 connected to the ground lines $91a$ and $92b$ (see FIG. 6) of the first and second flexible flat cables 91 and 92 is connected to the ground layer 96 of the control substrate 83 through the ground terminals 98 and the high-frequency reducing coils 99. Hence, the high-frequency noise (EMI) excited at each of the ground lines $91a$ and $92b$ of the first and second flexible flat cables 91 and 92 is attenuated by the high-frequency reducing coils 99 as shown in FIG. 10B. Accordingly, a situation in which the high-frequency noise (EMI) excited at each of the ground lines $91a$ and $92b$ of the first and second flexible flat cables 91 and 92 flows to the ground layer 96 and so forth of the control substrate 83 and a malfunction occurs in operation of the control circuit (ASIC) 82 etc. is suppressed or avoided.

Example

To ensure the effect of the above-described first exemplary embodiment of the invention, the inventor executes an experiment by prototyping the image reading device 3 as shown in FIGS. 5 and 10A and measuring the intensity of electric field of the high-frequency noise (EMI) radiated from the first and second flexible flat cables 91 and 92.

Figure 11A:
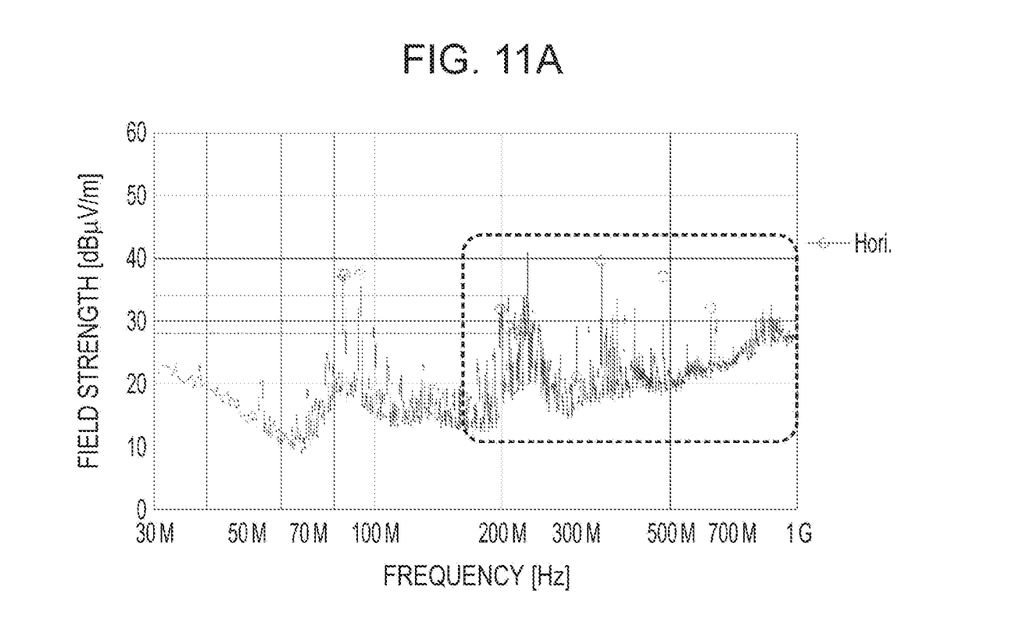
FIGS. 11A and 11B are graphs respectively showing results of an example and a comparative example.

FIG. 11A is a graph showing the intensity of electric field of the high-frequency noise (EMI) according to the result of the aforementioned example.

As shown in FIG. 11A, it is found that the high-frequency noise (EMI) in a band from 200 to 700 MHz is markedly reduced.

Comparative Example

The inventor executes an experiment by prototyping the image reading device 3 of related art as shown in FIGS. 5 and 9 as a comparative example and measuring the intensity of electric field of the high-frequency noise (EMI) radiated from the first and second flexible flat cables 91 and 92.

Figure 11B:
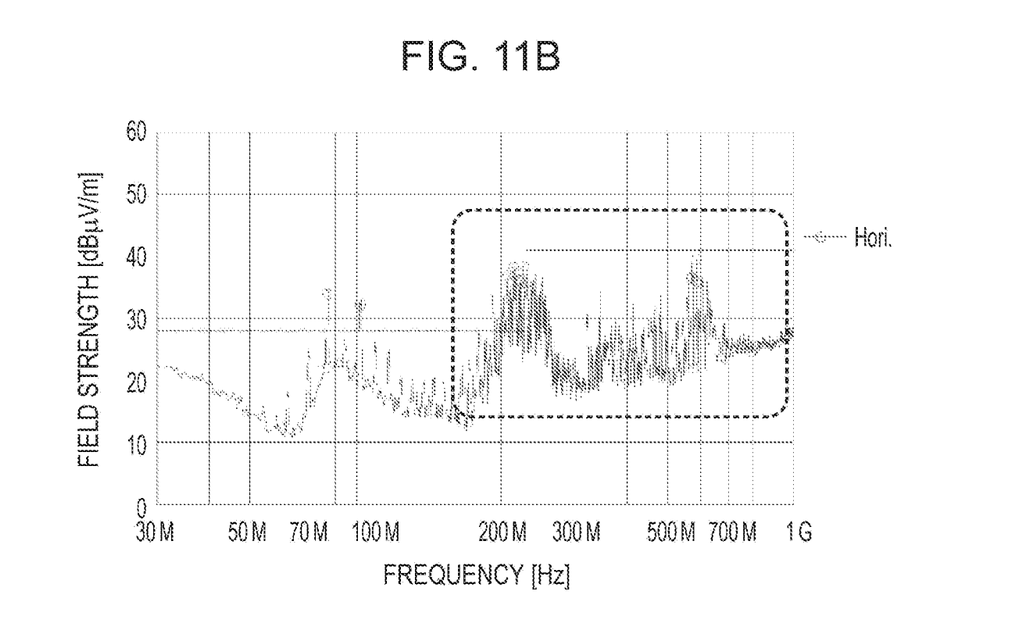

FIG. 11B is a graph showing the intensity of electric field of the high-frequency noise (EMI) according to the result of the aforementioned comparative example.

As shown in FIG. 11B, it is found that, if the high-frequency reducing coil 99 is not provided, the intensity of high-frequency noise (EMI) in a band from 200 to 700 MHz is large, and a malfunction of operation may occur in the control circuit (ASIC) 82 etc.

In the above-described exemplary embodiment, the case in which the high-frequency reducing coil is used as a high-frequency reducing element. However, the high-frequency reducing element is not limited thereto, and a C-R circuit, a tuner diode, or the like may be used.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A noise suppressing device comprising:
   a first circuit board that is ungrounded;
   a second circuit board connected to the first circuit board through a transmission line including:
      a signal line configured to transmit a high-frequency signal; and
      a ground line,
      wherein the second circuit board includes a ground layer that is grounded; and
   a high-frequency reducing element that is arranged between the ground layer of the second circuit board and the ground line of the transmission line and that is configured to reduce a high-frequency signal excited at the ground line of the transmission line,
   wherein the high-frequency reducing element comprises a high-frequency reducing coil.

2. The noise suppressing device according to claim 1, wherein a frequency of the high-frequency signal is in a range from about 100 MHz to about 1 GHz.

3. The noise suppressing device according to claim 2, wherein the inductance L of the high-frequency reducing element is set, for example, in a range from about 0.1 to about 1 µH.

4. The noise suppressing device according to claim 2, wherein the frequency of the high-frequency signal is in a range from 200 MHz to 700 MHz.

5. The noise suppressing device according to claim 1, further comprising a connector connected to the ground line,
   wherein the connector comprises a casing, and
   wherein the casing is connected to the ground layer through the high-frequency reducing element.

6. An image reading device comprising:
   an image reading substrate that is a substrate having mounted thereon an image reading element configured to read an image,
      wherein the image reading substrate is ungrounded;
   a control substrate connected to the image reading substrate through a transmission line including:

a signal line configured to transmit a high-frequency signals; and a ground line, wherein the control substrate includes a ground layer that is grounded; and a high-frequency reducing element that is arranged between the ground layer of the control substrate and the ground line of the transmission line and that is configured to reduce a high-frequency signal excited at the ground line of the transmission line, wherein the high-frequency reducing element comprises a high-frequency reducing coil.

7. An image forming apparatus comprising:

the image reading device according to claim 6; and an image forming section configured to form an image read by the image reading device, on a recording medium.

\* \* \* \* \*